(12) United States Patent
Sattler et al.

(10) Patent No.: US 7,805,683 B2
(45) Date of Patent: Sep. 28, 2010

(54) ACTION PAD

(75) Inventors: Juergen Sattler, Wiesloch (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 1142 days.

(21) Appl. No.: 11/026,057

(22) Filed: Jan. 3, 2005

(65) Prior Publication Data

US 2006/0031775 A1    Feb. 9, 2006

Related U.S. Application Data

(60) Provisional application No. 60/586,237, filed on Jul. 9, 2004, provisional application No. 60/620,683, filed on Oct. 22, 2004.

(51) Int. Cl.
G06F 3/048    (2006.01)
(52) U.S. Cl. .................................................. 715/769
(58) Field of Classification Search ........................ None
See application file for complete search history.

(56) References Cited

U.S. PATENT DOCUMENTS 5,421,012 A * 5/1995 Khoyi et al. ................. 718/107
7,293,279 B1 * 11/2007 Asmussen .................... 725/102
7,310,816 B1 * 12/2007 Burns et al. .................... 726/24
2001/0036254 A1 * 11/2001 Davis et al. ................. 379/67.1
2002/0087591 A1 * 7/2002 Reynar et al. ................ 707/500
2003/0126136 A1 * 7/2003 Omoigui ...................... 707/10
2004/0030982 A1 * 2/2004 Aldridge et al. ............. 714/776

* cited by examiner

*Primary Examiner*—Sara England
(74) *Attorney, Agent, or Firm*—Kenyon & Kenyon LLP

(57) ABSTRACT

Integration techniques for bridging business management software systems with external objects and data. An action pad application program window provides an interface to these integration techniques, and includes a drop area to receive external objects by drag-and-drop, an information area to display information about received external objects and data, and an action menu to display actions responsive to the received external objects and data. When an external object is received in the drop area, a determination is made as to what actions are associated with the object type, and the actions are displayed in the action menu. The content of the external object is also examined, and additional actions, dependent on the content, are displayed. The action pad application program also actively monitors a user's e-mail and calendar, importing messages and events into the business management systems.

38 Claims, 11 Drawing Sheets

ACTION PAD

RELATED APPLICATIONS

Priority is claimed from U.S. Provisional Application Nos. 60/586,237 filed Jul. 9, 2004, and 60/620,683 filed Oct. 22, 2004, the contents of which are incorporated herein by reference.

FIELD OF THE INVENTION

The present invention relates to software tools for integrating application objects and data such as e-mail, calendar entries, instant messages, and word processing documents into business backend systems such as information management, document management, and customer relationship management systems.

BACKGROUND

In existing business management software systems, such as information management, document management, and customer relationship management systems, an integration gap exists between external objects and the business management systems. In particular, there is a disconnect between external objects and the management systems. For example, while it is possible to import e-mail into document management systems, the assignment of the imported e-mail to the right business object is a manual or semi-manual process, as existing systems require a user to manually identify documents. Likewise, while a user can call up information about the sender of an e-mail from an information management system, the recognition of the sender is not automatic.

DETAILED DESCRIPTION

The present invention comprises integration techniques for bridging information, document, and customer relationship management systems with external objects and data. As an exemplary embodiment, an application program implementing these techniques is presented, called "action pad" herein. To enhance integration, the action pad application program also serves as an access platform to various communication and productivity tools.

The action pad application program may provide a variety of "modes," each mode being associated with a suite of services. Exemplary modes include a decision support mode responsive to external objects and data, a collaboration mode for communication, and a worklist mode for interacting with a worklist.

Figure 1:
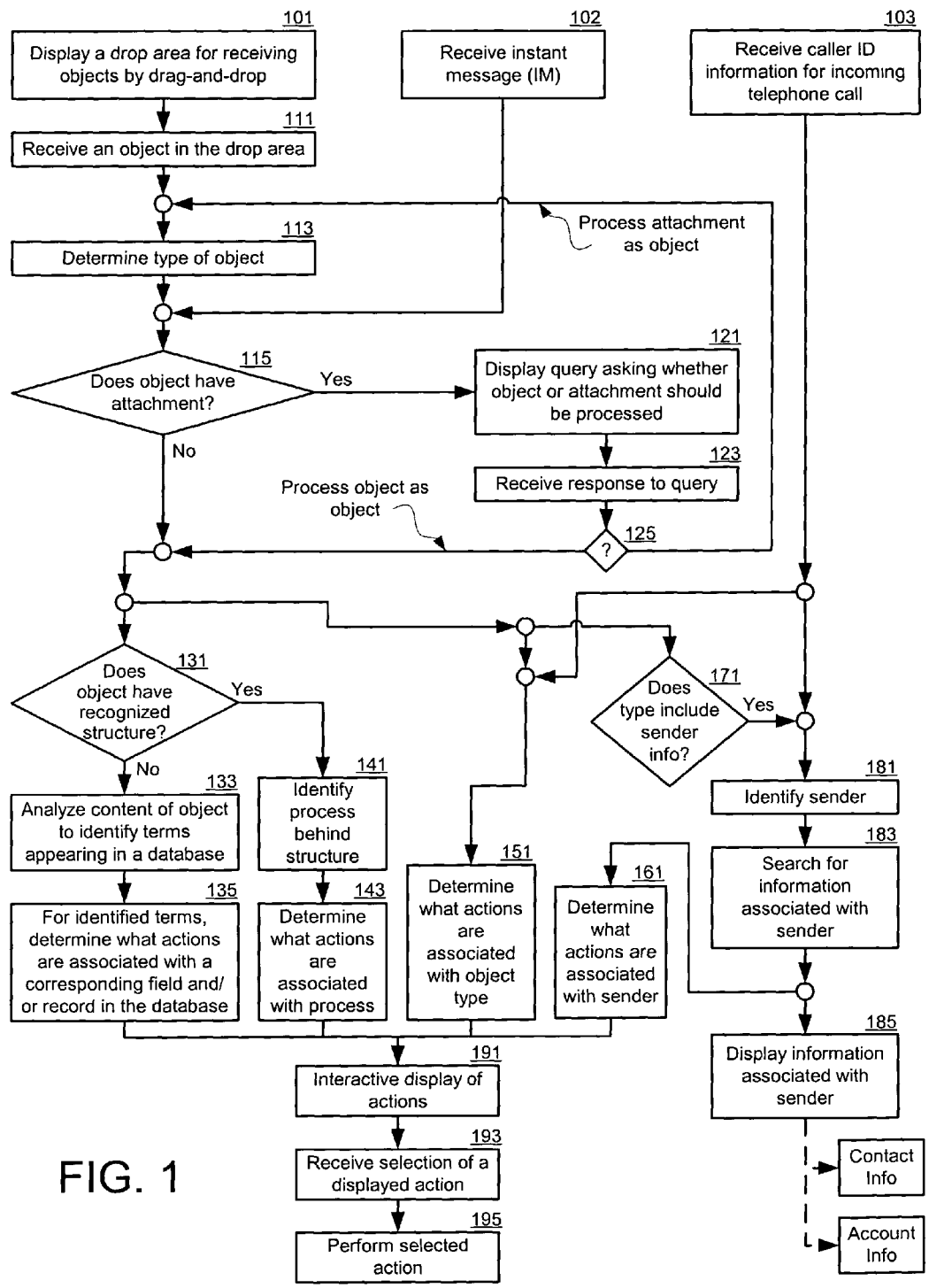
FIG. 1 is a flow chart illustrating the integration of external objects and data with an information management system after an external object or data is received by an action pad application program serving as a bridge to information management system.

FIG. 1 is a flow diagram illustrating an integration technique according to an embodiment of the invention, used with the decision support mode. A variety of information from an information management system is provided to support analysis and decision making with regard to external objects and data. Also provided are a plurality of actions specific to the external object and data. A plurality of pathways are provided to receive the external objects and data.

A first pathway is a drag-and-drop receptacle for the receipt of external objects. A drop area is displayed for receiving objects by drag-and-drop (101). These objects may include, for example, desktop and file system objects (e.g., Microsoft Windows File Explorer objects) and groupware objects (e.g., Microsoft Outlook e-mail, calendar, task, contact, or note objects; Lotus Notes objects, etc.).

After a drag-and-drop object is received (111), the object is examined to determine (113) its type. Types include, for example, e-mail, word processing document, page description file, and the like. If the object is of a type that may include attachments or enclosures (e.g., e-mail), the object is checked to see if attachments or enclosures are included (115). If an attachment (or enclosure) is included, a query is displayed, asking the user whether the object itself should be processed, or whether the user would prefer the attachment to be processed (121). In accordance with the response to the query (123), either the object or the attachment is selected for processing (125). If the attachment is selected, the procedure is repeated for the attachment, beginning with a determination of its type (113).

The object is analyzed to determine whether it has a recognized structure (131), such as that of a form. If the structure of the object is recognized, a business process associated with the structure is identified (141). This association between the form and the business structure may be described or identified in the form, or may be stored in a look-up table or database. A determination is made of what actions are associated with the identified process (143). An action associated with the process may include integrating data from a recognized structure back into the business process. For example, if the object is an order form, the ordering process is identified. Exemplary actions may include "check inventory for items ordered", "create quotation", and "accept order." As another example, if the object is a table of what items were found in stock, the inventory process is identified. An exemplary action may include "update inventory records."

If the object does not have a recognized structure, the content of the object is analyzed to identify context and subject matter (133). This may include, among other things, parsing text using a meta model and searching a database or index for the terms used. For example, the meta model may determine that the context is sales, such that the search may be restricted to a particular database or particular fields within a database. The meta model and/or index may also be used to identify which terms appearing in the object should be treated as compound terms.

A determination is then made of what actions are associated with the database fields and records corresponding to the identified terms (135). For example, if terms in the object identify a particular product, actions may include "display product description," which is linked to a subroutine that may retrieve product description information for the particular product from a backend system, and display the information; and "send information about product to sender of e-mail," which is linked to a subroutine that may retrieve the product description information from the backend system, create a new e-mail using a user's groupware or e-mail program, address the e-mail, add the information as an attachment to the e-mail, generate and add explanatory content to the e-mail using a pre-stored message or script, import a copy of the e-mail into the document management system, and make a record of the activity in the customer relationship management system.

A determination is also made of what actions are associated with a particular object type (151). For example, if the object is a Microsoft Outlook contact, actions may include "store contact as a business partner", which is linked to a subroutine which extracts the information stored in the contact; searches the information management system to determine if the contact is already recorded as a business partner; updates the data stored in the information management system if the data in the contact is different than the business partner record, or creates a new business partner record in the information management system; if a new record is created, the subroutine will automatically populate fields of the business partner record with information from the contact, and prompts the user for any additional information needed to complete the record; record identifiers may be added in the document management system and customer relationship management system; and depending upon the type of business partner indicated, an account may be created in a financial accounting system.

If the object type is a type that includes information identifying the sender (171), such as e-mail or an instant message, the sender is identified (181) and a search is performed for information associated with the sender (183). Examples of such information include contact and account information for the sender. The information about the sender is displayed (185) by the action pad application, and a determination is made as to actions that are associated with the sender (161). For example, actions may include "display balance of account," if the sender has an account with a balance.

Although not shown in FIG. 1, sender information may also be determined from the analysis of object content (i.e., a process between 133 and 181). This may be used if, for example, the object type does not include sender information, but the sender can be determined from content. For example, if the object is a general business letter stored as a word processing document, the sender is readily determinable. Similar processing may also be performed on objects having a recognized structure, in which case determining the sender simply involves extracting data from a particular field or area of the structure.

All of the actions (from 135, 143, 151, 161) are displayed (191) by the action pad application program in an interactive window, enabling a user to select an action for execution. If a selection of a displayed action is received (193), the action is performed (195).

A second pathway for receipt of external objects and data is through instant messages (102). After an instant message is received, it is processed as an instant messaging-type object by the system. Since the type of the object is known at receipt, it is unnecessary to identify the type of the object (113), unlike drag-and-drop objects. Otherwise, processing of instant messages follows the same process as described above for drag-and-drop objects.

A third pathway for receipt of external data is telephone caller identification (caller ID) information transmitted over a telephone or voice over IP network to identify an incoming telephone call (103). Processing comprises identifying the caller and caller information (181, 183), determining what actions are associated with a caller-ID-type object (151), and determining what actions are associated with the caller (161). An exemplary action for a telephone call is the creation of a customer relationship management (CRM) activity or record. Additionally, the history of incoming calls (and outgoing calls triggered from the buddy list provided in collaboration mode, discussed below) optionally can be logged.

Figure 2:
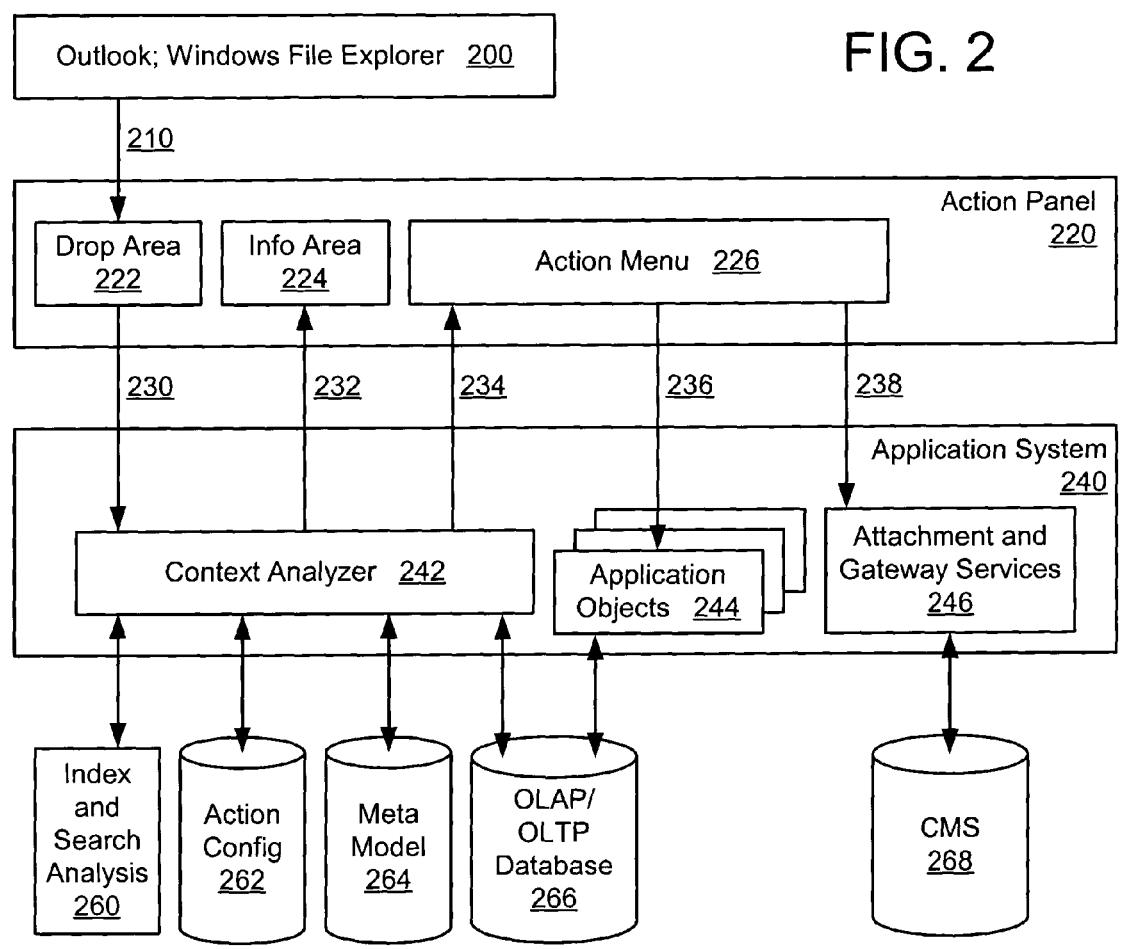
FIG. 2 is a block diagram of exemplary elements involved in the integration of external objects and data with the information management system.

FIG. 2 illustrates exemplary elements involved in the operation of the action pad application program. Drag-and-drop objects are received (210) from the file system or e-mail program (200) into a drop area (222) provided in the action panel window (220). The received drag-and-drop object is passed (230) to a context analyzer (242) of an application system program (240). The context analyzer (242) determines the object type (113), determines whether an attachment should be processed (115, 125), and performs the other processing (131-183) described in the discussion of FIG. 1.

Several subsystems may be utilized or accessed by the context analyzer (242) to process the object. A first subsystem is an indexing and classification system (260) (i.e., a search engine). An exemplary system is SAP's Fast Search based on the TREX search engine from SAP. The indexing and classification system (260) receives terms from the context analyzer (242), and searches database(s) for relevant records.

A second subsystem is an action configuration database (262). This subsystem interrelates object type, sender, and content information to actions. Each action is preferably associated with a particular process or program for action execution.

A third subsystem is the meta model (264), such as the Enterprise Service Architecture (ESA) meta model. The meta model (264) provides the context analyzer (242) with meta data information for the content found in an object. Meta data information may include a description of the of content and a description of the business process underlying the content. For example, if content is identified as referring to a sales order, the meta data may identify that sales orders have features such as order items, and that the sales order may have relations to other business objects such as a particular business partner, account, invoice, order, or inventory record.

A fourth subsystem is an online analytical processing (OLAP) system and/or an online transaction processing (OLTP) system/database (266). OLAP systems store information on the organization of data in a database and offer extensive functions for analyzing the data. OLAP systems are a form of business warehouse (BW) system for analytics and are often used in data mining. OLTP systems facilitate and manage transaction-oriented applications, for data entry and retrieval transactions. OLTP systems are used in a number of industries, including banking, airlines, mailorder, supermarkets, and manufacturers. These systems provide the context analyzer with content and data which are copied to and/or indexed by the index and search analysis subsystem (260).

The content analyzer (242) recognizes structure (e.g., forms) by comparing content to known structures, associated with particular processes. For example, forms may include embedded tags or hidden fields which describe the form, or which contain a form identifier. As another example, the field pattern of the form may be compared to stored field patterns.

The identity of the business process associated with the structure may also be described or identified in the form, or may be stored as being associated with the structure in a look-up table or database accessible to the context analyzer (242).

The context analyzer (242) outputs (232) information about the sender of the object to an information area (224) of the action panel (220) for display. Similarly, a list of possible action is output (234) to an action menu (226) of the action panel (220). If an action is selected that involves action on data in the OLAP/OLTP database (236), an application subroutine (244) to perform that action is executed. Execution of the application subroutine (244) may be self-contained in the application system program (240), or may include a call to an external program (e.g., a groupware program, a web browser, a spreadsheet or word processing program, etc.). If an action is selected that involves transmission of information to others (238), attachment and gateway services (246) of the application system (240) perform the action in collaboration with a customer management system (268).

Figure 3:
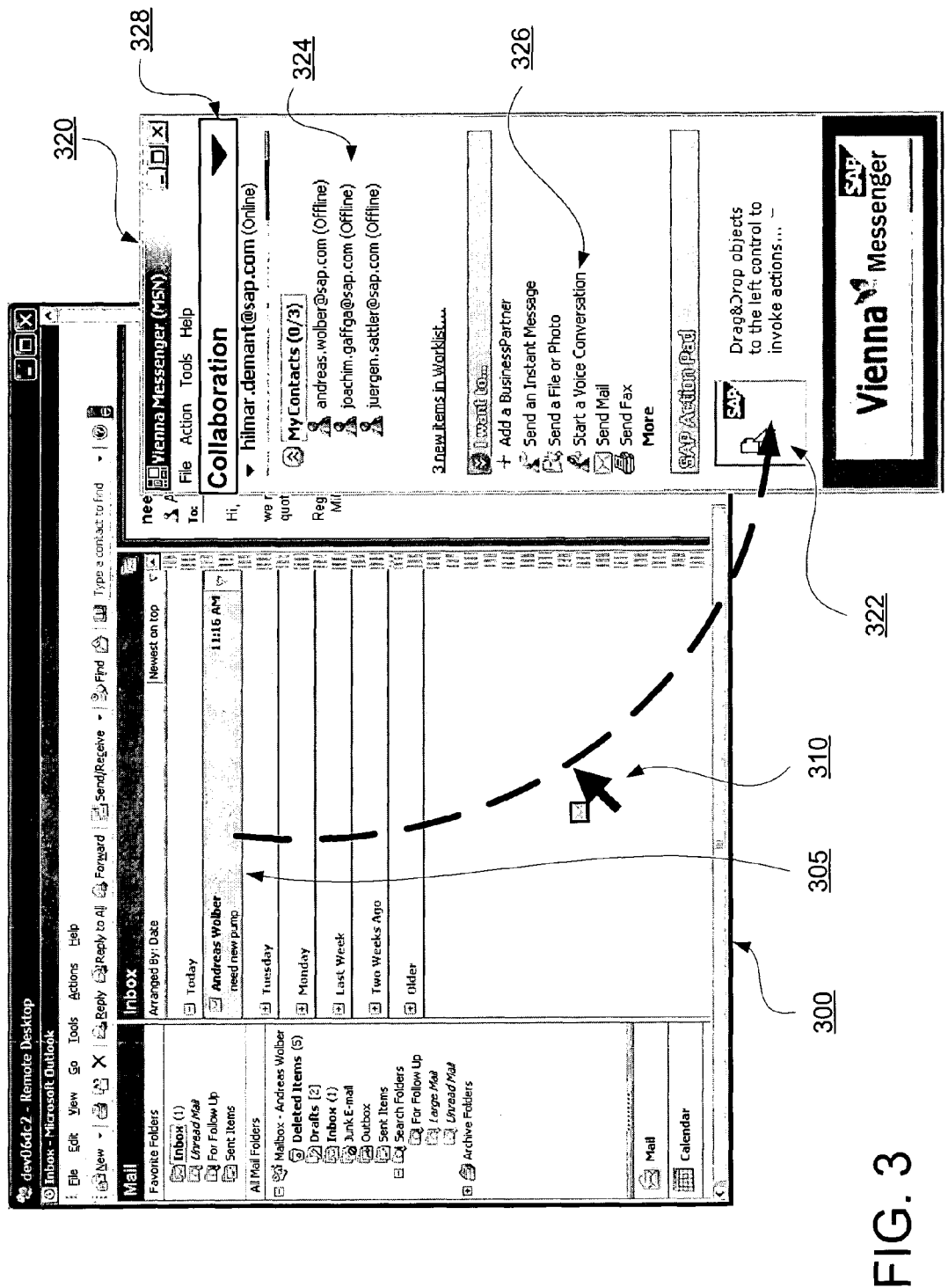
FIG. 3 illustrates an e-mail being provided to the action pad application program.
Figure 4:
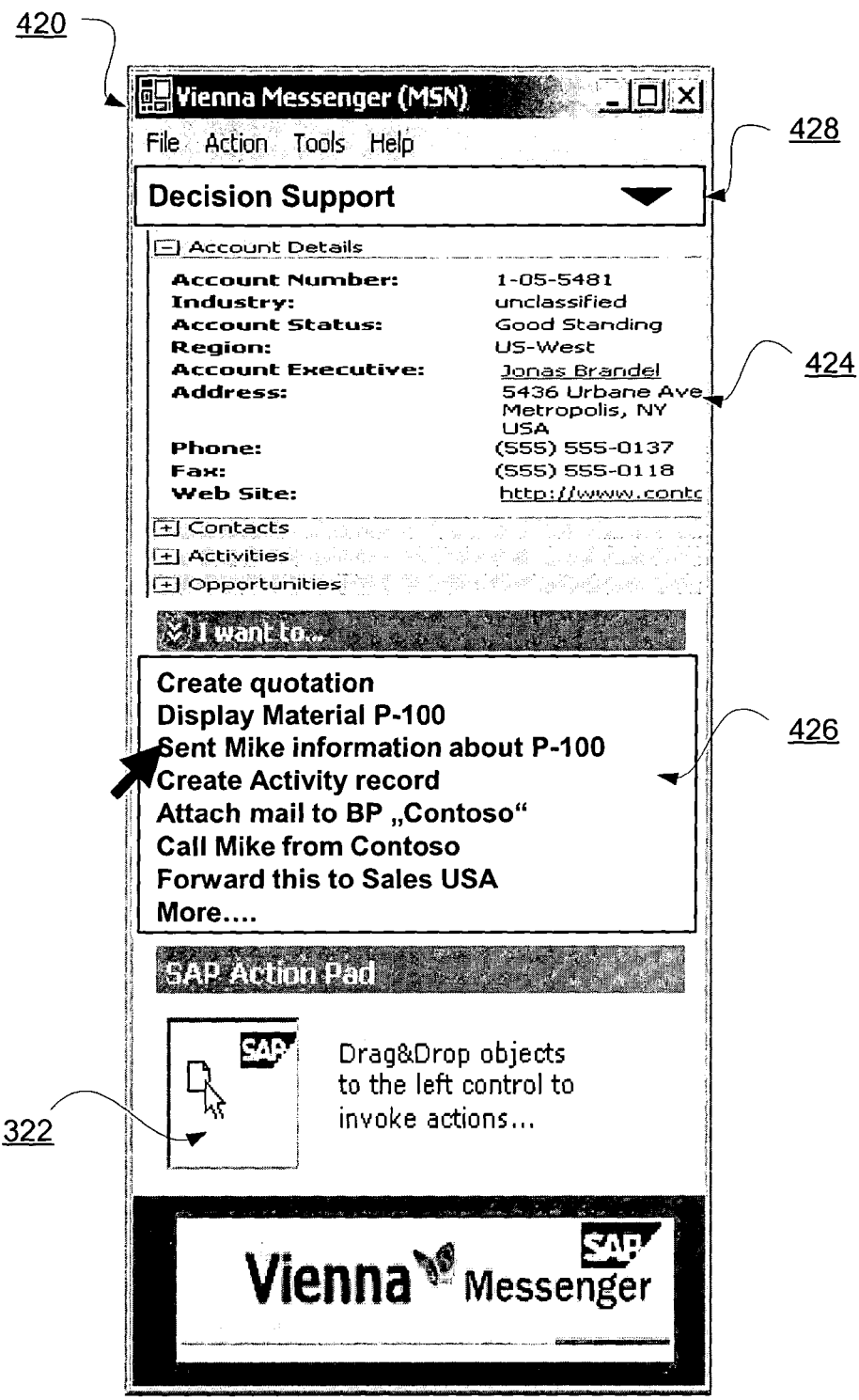
FIG. 4 illustrates exemplary information and actions presented by the action pad application program after an e-mail is provided, as shown in FIG. 3.

FIGS. 3 and 4 demonstrate specific examples of action pad operation. In FIG. 3, the action panel (320) is shown in collaboration mode, as indicated in the pull-down menu (328). The status of instant message contacts appears in information area 324, and a plurality of collaboration action appear in action menu 326. A drop area is also included for receiving objects by drag-and-drop (322).

After an email (305) from an e-mail application (300) is dragged (310) to the drop area (322), the mode of the action panel may switch to decision support mode by default. In FIG. 4, the action panel (420) is shown in decision support mode, as indicated in the pull-down menu (428). A plurality of information about the sender of the received e-mail object appears in the information area (424), including account details and contact information. The plurality of actions appear in the action menu (426).

Figure 5A:
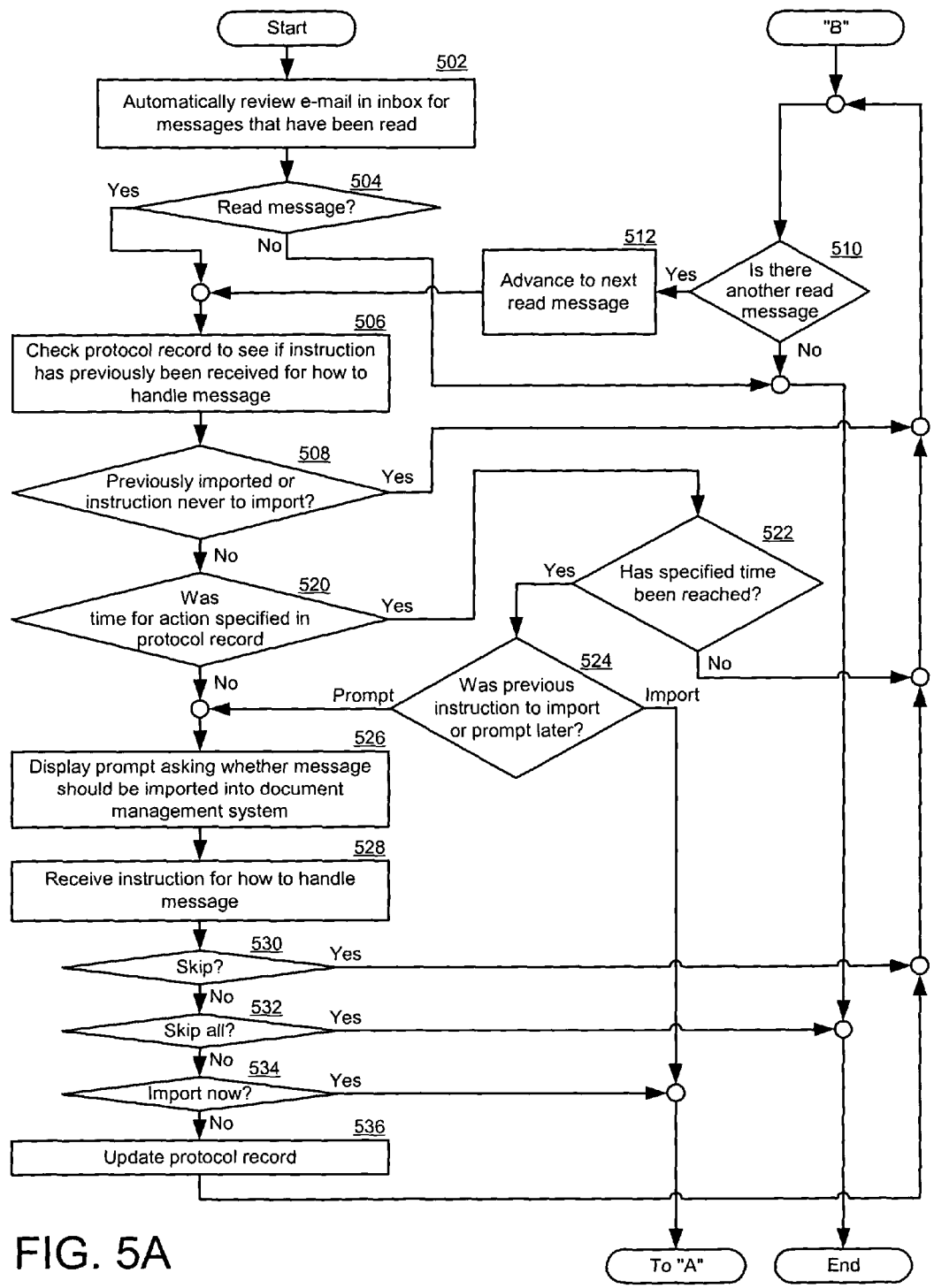
FIGS. 5A and 5B are a flow chart illustrating the integration of e-mail into a document management system by the action pad application program.
Figure 5B:
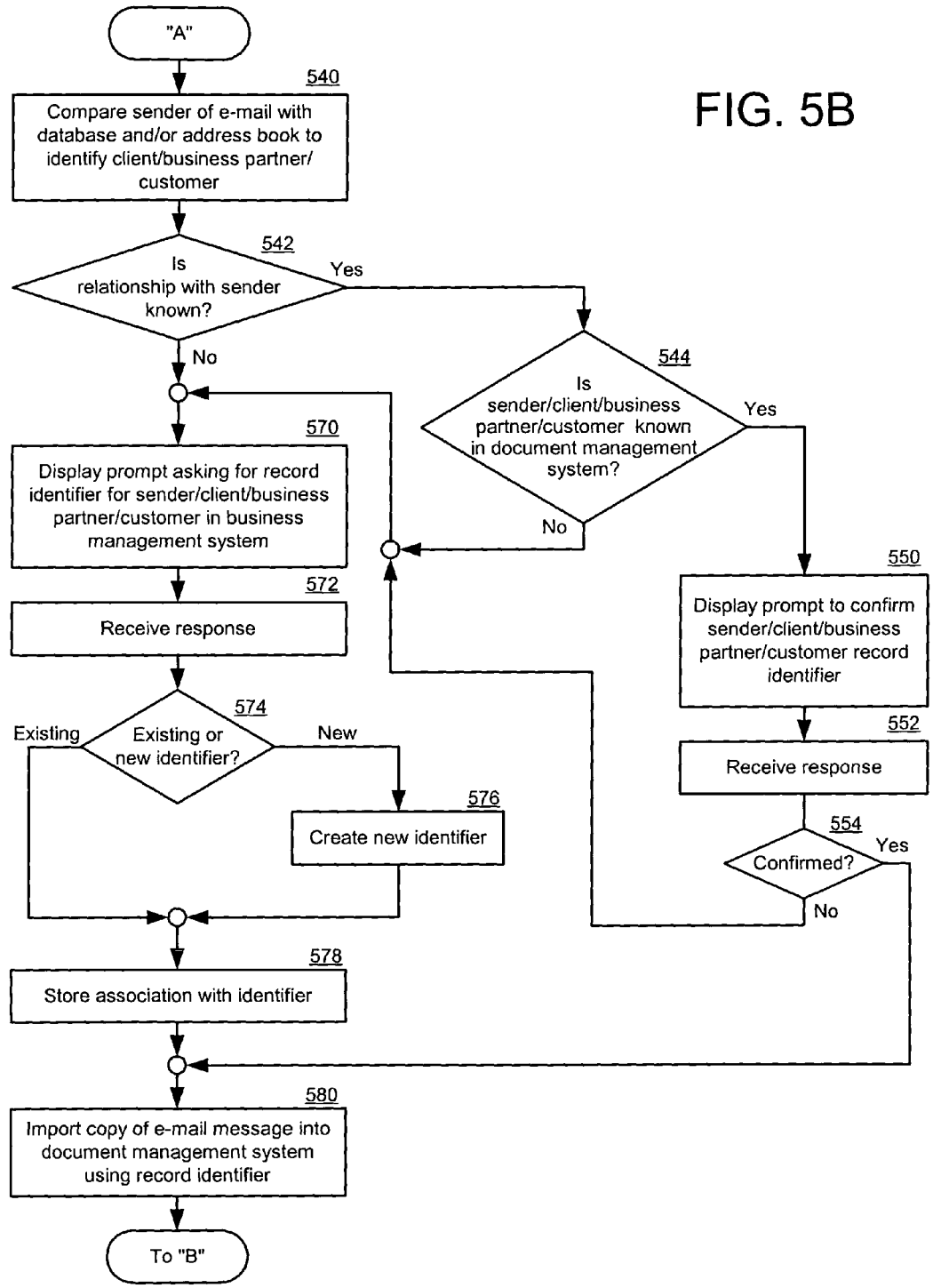

FIGS. 5A and 5B are flow diagrams illustrating a further embodiment of the invention, used to support collaboration mode. This embodiment bridges e-mail services and a document management system, selectively importing e-mail into the document management system with a minimum of user intervention.

At a scheduled time such as start-up, when a user activates an e-mail program, or when initiated by a user (e.g., as an "action"), the user's e-mail inbox is checked for messages marked as read (502). For example, this check may be included as part of a synchronization step when e-mails other forms of interactive communication (e.g, tasks, appointments) are transferred from a messaging and collaboration system on a backend server (e.g., Microsoft Exchange server) to a user's client device (e.g., personal computer, mobile device). If a read message is found (504), a protocol record is checked to see if previously received instructions direct how the message is to be handled (506). If the protocol record includes an instruction directing that the message never be imported (508), and there is another read message (510), the process advances to the next read message (512) and repeats.

The protocol record may reside on a system remote from the user's client device. Likewise, the check of the protocol record may be performed by middleware between the messaging and collaboration server and the user's client device. The middleware may, among other methods, poll the messaging and collaboration server regarding message status.

If the protocol record indicates that a time for action was specified (520), and the specified time has been reached (522), then the user is prompted of instructions, or the e-mail is imported, depending on which action was specified (524). The specified time may have been a number of days, a specific date, or the like.

If no instruction for the message is included in the protocol record, or if the protocol record indicated to prompt again later, a prompt is displayed asking whether the read message should be imported into the document management system (526). A variety of other options, beside "import" can be included, such as "skip," "skip all," "import in X days," "ask again in X days," and the like.

If the user's instruction (528) is "skip" (530), the process moves on to the next read message, if any. If the instruction is "skip all" (532), the process ends. If the instruction is "import now" (532), the message is imported. Otherwise, the protocol record is updated with whatever instruction was received (536), and the process moves on to the next read message, if any.

FIG. 5B illustrates the importation of a message into the document management system. The sender of the e-mail is compared with a database and/or the user's address book to identify whether the sender is a known client, business partner, customer, or the like (540). If there is an established relationship with the sender (542), a check is made as to whether the document management recognizes either the sender or the sender's organization. In particular, a document management record identifier is needed to store the record, so a determination is made as to whether an identifier exist. For example, if the e-mail is from an employee of a business partner, and the document management system has a listing for the business partner, the business partner's identifier will be used to index the record.

If an identifier is found, then optionally, a prompt can be displayed (550) to confirm (552, 554) that the proper identifier has been selected. Likewise, if multiple possible identifiers are found, the prompt can provide a choice to the user. As an alternative, a hierarchy or heuristic may be used to automatically to resolve which identifier to use if plural identifiers are found, especially if no confirmation process (550-554) is utilized. A copy of the message is then imported into the management system using the record identifier (580). Preferably, the original message is left in the inbox. However, a user may be provided the option of deleting the original message after it is imported.

If no identifier is found in the document management system, a prompt is displayed asking for a record identifier for the sender and/or the sender's organization (570). This prompt may include a menu listing all of the identifiers in the system, and provide the user the opportunity to create a new document management system identifier. A response (572) is received to the prompt, indicating whether to use (574) an existing identifier or create a new identifier (576). A record is stored associating the sender with the identifier (578) so that future e-mails can be handled automatically. A copy of the message is then stored in the document management system (580).

The protocol record may become unwieldy over time, and therefore can be purged periodically. In one embodiment, the system may erase preferences for a message once the message is removed from the inbox. For example, the system may compare the protocol record to the inbox and delete protocol record entries for messages that no longer exist. Alternatively, depending upon the ease of integration with the e-mail program, the system may delete an entry in the protocol record when the corresponding message is deleted or moved. And, of course, the system may purge entries that are older than a certain amount of time. Additionally, rules can be included so that messages from certain senders or organizations always are handled in a certain way (e.g., automatically import; never import).

The system may also be configured to automatically import all read messages, all messages occurring prior to a certain date or over a certain age (e.g., older than one week), all messages since the last synchronization, or all messages occurring before a certain date or over a certain age. In such implementations, which may be rule-based, the protocol record may comprise a list of e-mails already imported or a time stamp indicating the date and time of the last imported message. The middleware may simply poll the messaging and collaboration server regarding relevant changes and imports the messages satisfying a criteria.

Further, document management system records often include a variety of other fields, beside the organization identifier (e.g., client, business partner, customer identifier). Examples include a general description of the document and a particular matter identifier. As a further feature, the general description may be the subject line of the e-mail, the date of the e-mail, the sender's name, or some combination thereof. Moreover, the context engine 242 (FIG. 2) may be used to determine a matter identifier, or information needed for the other fields.

When the message is imported (580) into document management system, the context engine 242 may also be used to analyze the message and provide additional functionality. For example, if the message or a message attachment has a recognized structure (131) (e.g., a form), then after the process behind the structure is identified (141), further processing may be automatically performed. For example, an order form might be stored as such, rather than as a simple message. As another example, if the message relates to an appointment, a calendar event or a customer relationship management activity (see FIG. 6) might be generated. The user may prompted when additional information is needed (e.g., for an appointment or a CRM activity) or if there is a problem (e.g. something is incorrect with the content of a form).

The embodiment is not limited to a user's inbox, and can be used with whatever message source is specified. Additionally, while the process is described as handling messages one-by-one, a list of all the read messages may be displayed, prompting the user to indicate which messages should be imported.

Further, instant messages can also be imported into the document management system. When an instant message is received, the instant message display screen may include a prompt asking whether the message should be imported into the document management system. If the user responds in the affirmative, the process is essentially the same as shown in FIG. 5B, except that after the message is stored, the process ends.

Figure 6:
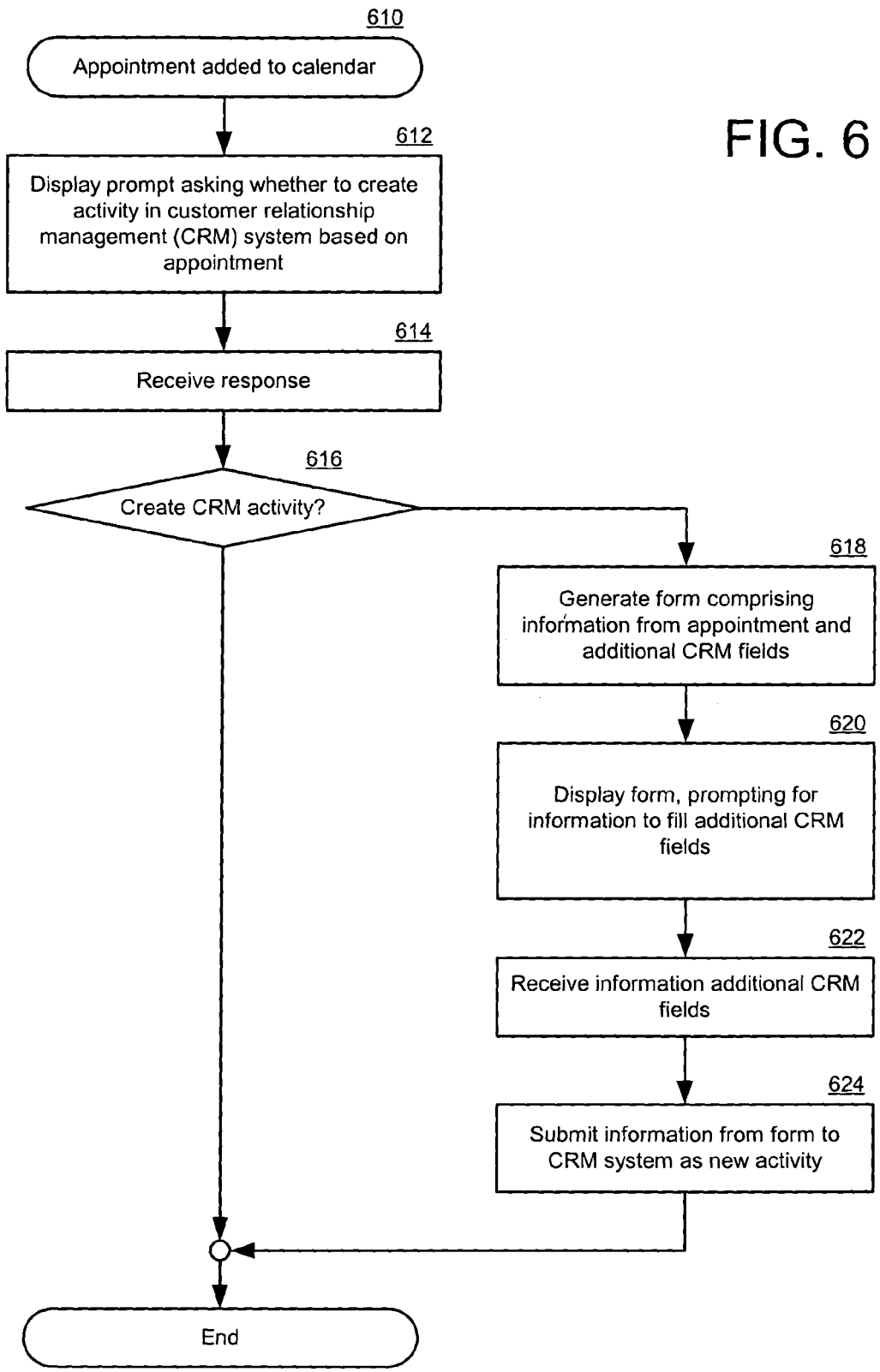
FIG. 6 is a flow chart illustrating the integration of a calendar appointment into a customer relationship management system.

FIG. 6 is an integration technique illustrating a further embodiment of the invention for integrating calendar entries into a customer relationship management (CRM) system. After an appointment is added to an electronic calendar (610), a prompt is displayed asking the user whether a corresponding activity should be created in the CRM system (612). If the response (614) from the user is to create a CRM activity (614), a form is generated comprising information from the appointment and providing additional CRM system fields (618). The form is displayed, prompting the user for the additional CRM information (620). After the additional CRM information is received (622), the information from the form is submitted to the CRM system as a new activity (624).

Figure 7:
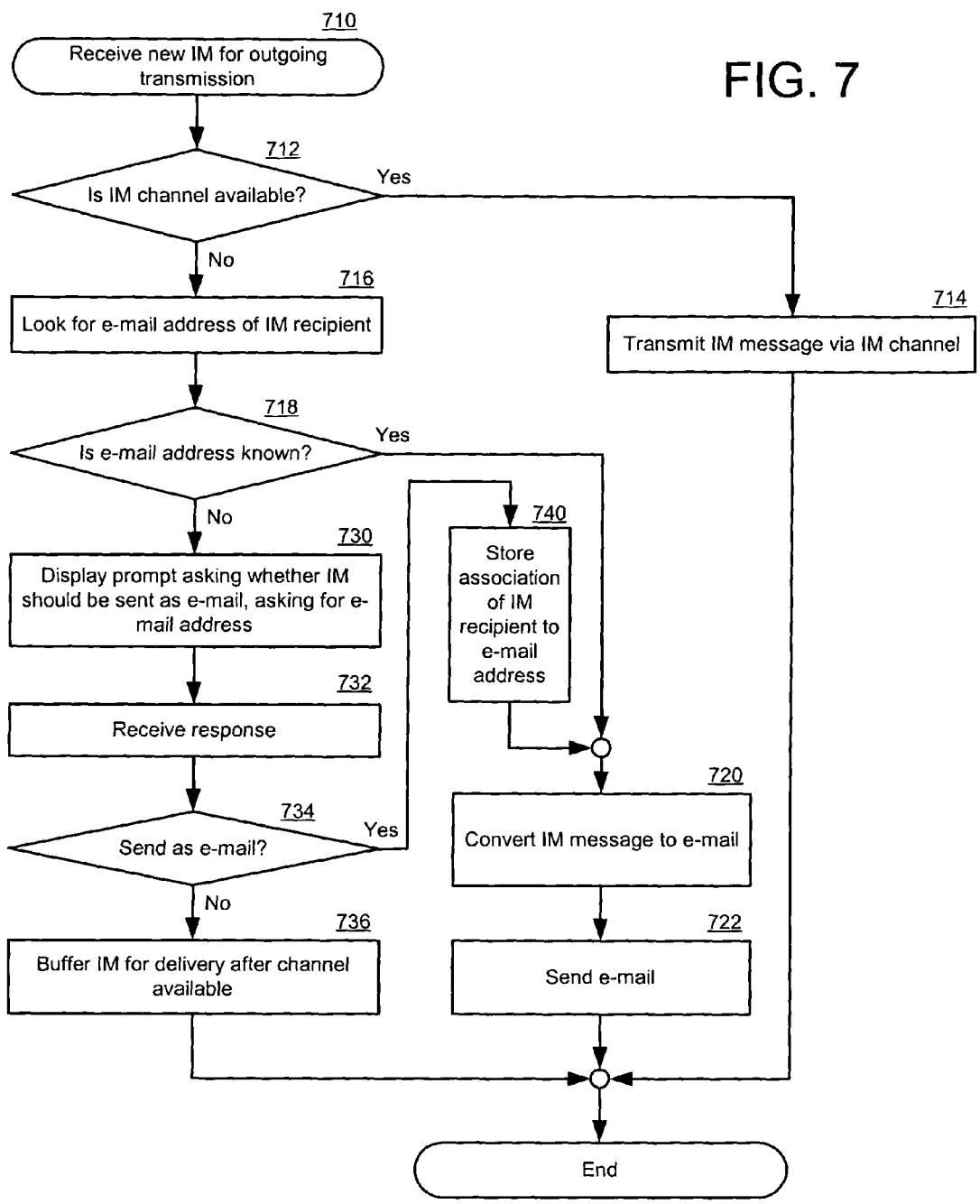
FIGS. 7 and 8 are flow charts illustrating the handling of outgoing and incoming instant messages by the action pad application program.
Figure 8:
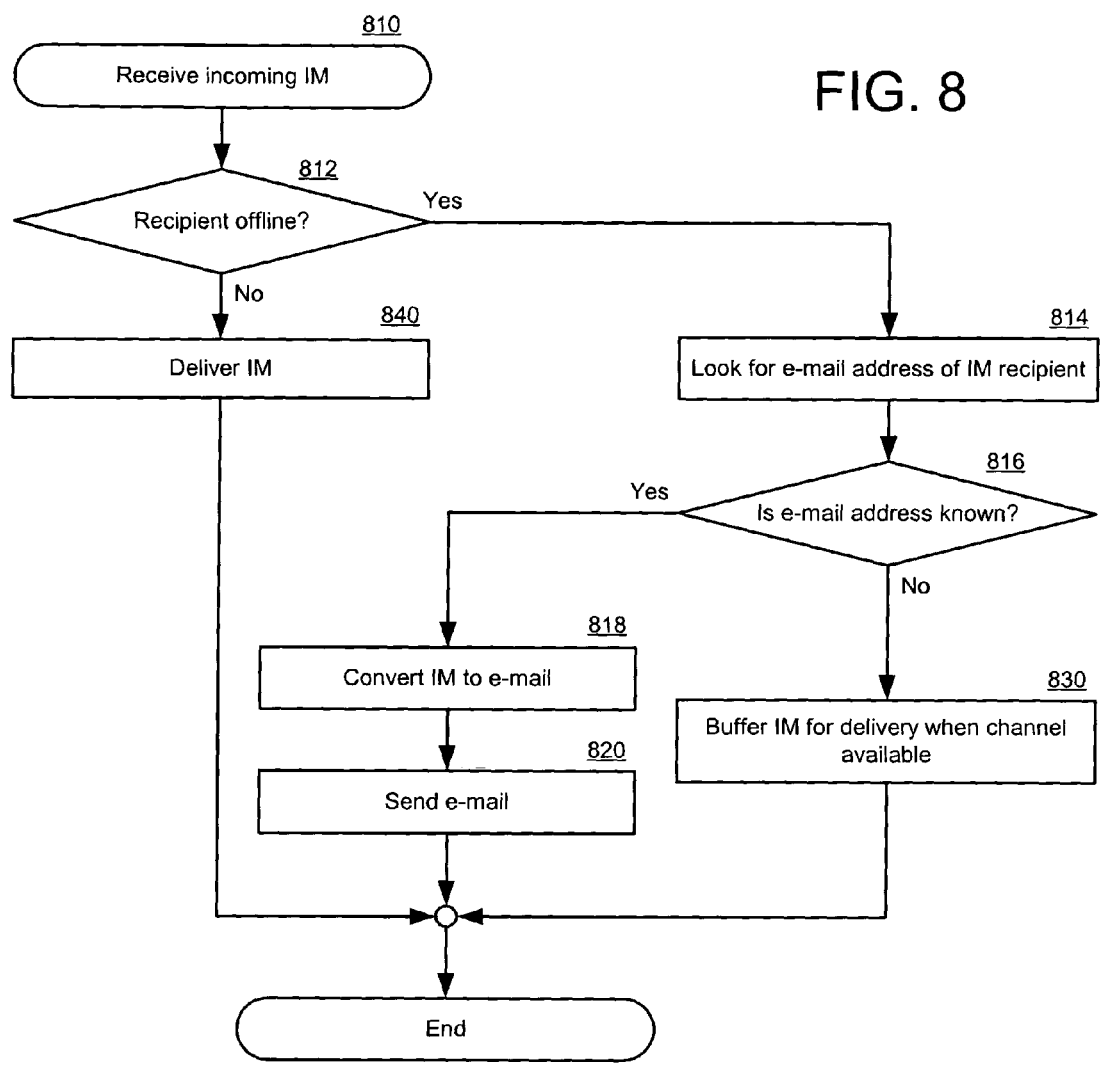

FIGS. 7 and 8 are integration techniques illustrating further embodiments of the invention, used to support collaboration mode. Both techniques shift instant messages over to e-mail from instant messaging when a user or an IM channel is otherwise unavailable.

In FIG. 7, if a new instant message is received (710) for outgoing transmission, but the IM channel is not available (712) (e.g., the user is offline), the action pad will attempt to send the instant message by e-mail. This feature avoids queuing instant messages for the recipient, and may be particularly beneficial when the recipient is offsite but is still able to receive e-mail (e.g., cellular e-mail systems).

The action pad application program looks up whether an e-mail address is available for the instant message recipient (716). If the e-mail address is known (718), the message is converted to e-mail (720), and sent to the recipient (722). If the e-mail address is unknown, the a prompt may be displayed (730) asking whether the instant message should be sent by e-mail, and if so, asking for the e-mail address to user (730). A response is received (732) from the user. If the user provides an address for transmission by e-mail (734), the association between the instant message recipient and the e-mail address is stored (740), and the message is converted into e-mail (720) and sent (722). Otherwise, the instant message is buffered for delivery after the channel becomes available (736). In the alternative, if the e-mail address for the instant message recipient is unknown (718), the process can end.

In FIG. 8, if an instant message is received for delivery (810), but the recipient is offline (812), the instant message can be forwarded to the recipient's e-mail. A collaboration mode feature of the action pad preferably includes built-in instant messaging capability. As is known in existing instant messaging software, a user may set instant messaging to "offline," even when the instant messaging program is up-and-running. Accordingly, the action pad application program can be running and the user can be "offline" at the same time.

If the recipient is offline, a look-up is performed for the e-mail address for the recipient (814). If the e-mail address is known (816), the instant message is converted to e-mail (818) and forwarded (820). Otherwise, the instant message is buffered for later delivery (830).

The embodiments in FIGS. 7 and 8 may also be used with other instant messaging status levels. For example, if the status of a recipient shows them "away" (e.g., at a terminal that is online, but that has been inactive for a preset amount of time), an instant message may also be treated as described above.

Figure 9:
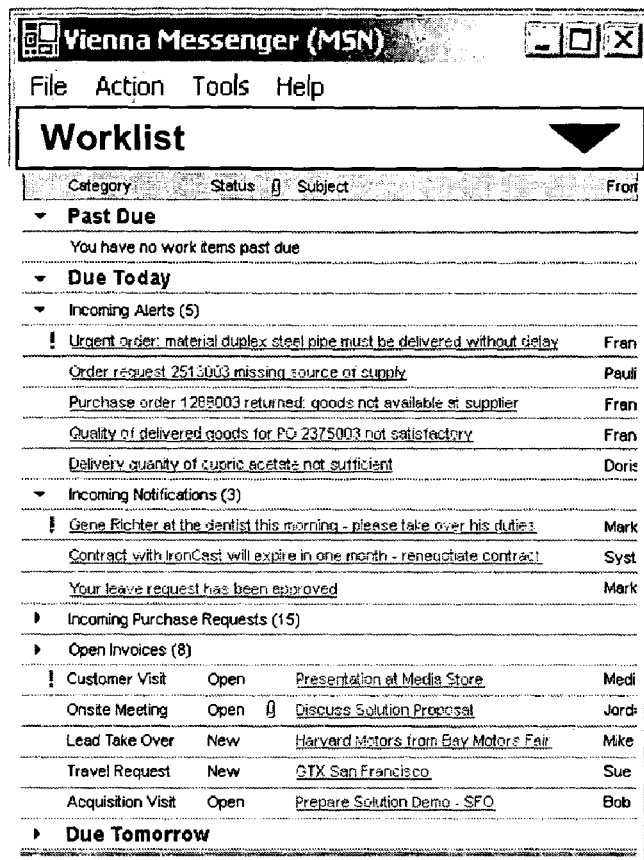
FIG. 9 illustrates an exemplary worklist as displayed by the action pad application program.
Figure 9:
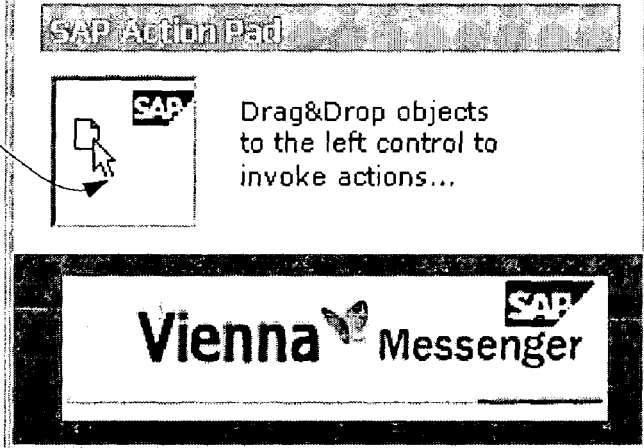

FIG. 9 illustrates the action pad (920) in worklist mode, as indicated in the pull-down menu (928). This mode allows easy access to a user's worklist (929). Worklist items may also be dropped in the drag-and-drop area (322), causing a switch into decision making mode, and the processing of the worklist item as an object.

Figure 10:
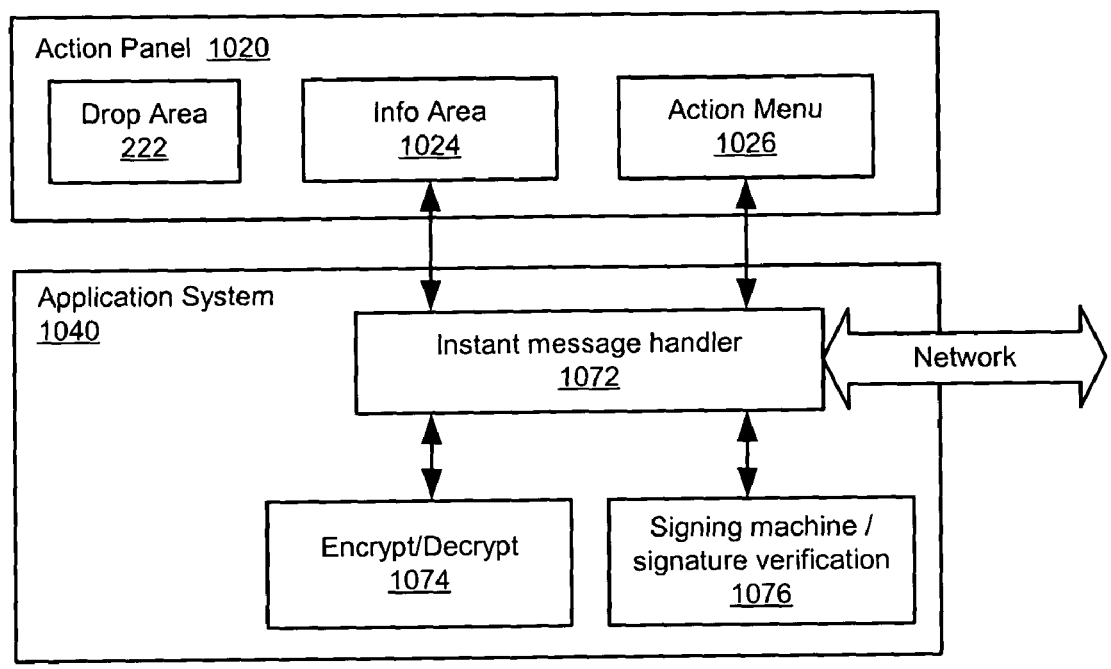
FIG. 10 is a block diagram of exemplary elements involved in instant messaging collaboration through the action pad application program.

In collaboration mode, the action panel (320) provides instant messaging features, as referred to above in the discussion of FIG. 3. A block diagram of elements involved in collaboration mode is provided in FIG. 10. The action panel interface (1020) includes a status list of instant messaging contacts displayed in the information area (1024), and a menu of instant messaging actions displayed in the action menu (1026). Instant messages are generated and received by the instant message handler (1072) of the application system (1040). For example, an instant message is generated in response to a selection of a contact, or a corresponding action, being received in the action panel (1020).

Since the action pad application program is a conduit to the business management systems, security and data integrity are of particular concern. To protect these systems, the action pad application program includes security safeguards which may automatically be applied to instant messages.

A further embodiment of the invention is the use of digital certificates to validate instant messages between action pad application programs. A signing machine (1044) is included which uses security certificates (i.e., digital signatures) to automatically sign and validate instant messages, and/or attachments to instant messages, between users. If an incoming instant message or attachment contains an invalid signature, a notification may be displayed when the message is opened, and/or a prompt may be displayed asking the user whether to accept the message. Moreover, in the embodiment illustrated in FIG. 1, if an instant message or attachment is received (102) with an invalid certificate, processing may be blocked, or the user may be prompted to provide express authorization prior to acceptance for processing. The same treatments may also be given to instant messages lacking certificates.

As the action pad application program may be used to send instant messages to generic instant messaging systems, which users utilize (or do not utilize) certificates may be designated within the contact list. Additionally, although the preferred implementation is to automatically use certificates on instant messages to users designated as being equipped with signing machines (1076), alternatives include offering certificates as an option when the instant message is generated or attachment is added, or including "actions" for the sending of both signed and unsigned instant messages and attachments.

A further embodiment of the invention provides automatic encryption of attachments to outgoing instant messages prior to transmission, and the automatic decryption of attachments to incoming instant attachments. Encryption/decryption (1074) may be handled by subroutines provided to the instant message handler, or may be provided by a separate subsystem. Any method may be used, such as public-key encryption. If a pre-designated key is used, the recipient's key (e.g., public key) may be stored in the contact list. Additionally, although the preferred implementation is to automatically use encryption on attachments, alternatives include offering encryption as an option when the attachment is added to the instant message, or including "actions" for attaching both encrypted and unencrypted documents. Also, attachments in messages having invalid certificates may not be decrypted until a user response to accept the message is received, as discussed above, and in the embodiment illustrated in FIG. 1, an attachment may not be decrypted until a response is received (123) to process the attachment.

The above embodiments may be implemented individually, as well as in combination. Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A method for integrating objects external to a business information management system into the business information management system via a user interface of an application program, each of the objects including content and having one of a plurality of object types, the application program operating according to a collaboration mode and a decision support mode, comprising:

displaying the user interface in the collaboration mode, the user interface including a drop area for receiving the objects by the business information management system and an action area having a plurality of graphical controls corresponding to functions under the collaboration mode;

when the object is moved to the drop area, switching the application program to the decision support mode;

determining an object type of the object;

based upon the object type, determining a set of subroutines corresponding to the object type that updates data stored in the business information system;

comparing content structure of the object with known content structures, the known content structures including at least one of a form structure and a table structure, and further comparing a field pattern of the form structure for the content of the object received in the drop area to pre-stored field patterns to determine whether the object has a recognized form structure;

when the comparison generates a match, identifying a set of subroutines associated with data fields in the matching structure;

if the comparison does not generate a match,
  analyzing the content of the object for identifying context and subject matter of the object content, and
  based on the identified context and subject matter of the object content, determining a set of subroutines associated with the identified context and subject matter; and displaying an interactive list of the subroutines associated with the object type, the matching structure, and the identified context and subject matter of the object content.

2. The method according to claim 1, further comprising:
scanning the content of the object received in the drop area for a structure identifier, and comparing the structure identifier to pre-stored identifiers to determine whether the object has a recognized structure.

3. The method according to claim 1, further comprising:
comparing the content of the object received in the drop area to pre-stored patterns to determine whether the object has a recognized structure.

4. The method according to claim 1, further comprising:
identifying the sender of the received object; searching for information associated with the identified sender;

determining what subroutines are associated with the sender and the information associated with the sender;

displaying the subroutines associated with the sender and the information associated with the sender in the interactive list; and displaying the information associated with the sender.

5. The method according to claim 4, further comprising:
receiving telephone-caller identification data sent with a telephone call;

searching for information associated with the caller; determining what actions are associated with the caller and the information associated with the caller;

determining what subroutines are associated with telephone calls;

displaying an interactive list of subroutines comprising the subroutines associated with the caller and the information associated with the caller, and the subroutines associated with telephone calls; and displaying the information associated with the caller.

6. The method according to claim 1, further comprising:
if the object received in the drop area includes an attachment, displaying a query asking whether the object or the attachment should be processed; and processing the attachment as the object, if a response to the query indicates that the attachment should be processed.

7. The method according to claim 1, further comprising:
receiving an instant message; determining what subroutines are associated with instant messages;
analyzing the content of the instant message to identify context and subject matter of the instant message, and for the identified context and subject matter of the instant message, determining what subroutines are associated with; and
displaying an interactive list of the subroutines associated with the instant message, and the subroutines associated with the identified context and subject matter of the instant message.

8. The method according to claim 1, further comprising:
receiving an instant message;
if the instant message includes an attachment, displaying a query asking whether the instant message or the attachment should be processed;
if a response to the query indicates that the attachment should be processed, then:
  based upon an object type of the attachment, determining what subroutines are associated with the object type;
  if the attachment has a recognized structure, identifying a process associated with the recognized structure, and determining what subroutines are associated with the process;
  if the attachment does not have a recognized structure, analyzing content of the attachment to identify context and subject matter of the attachment, and for identified context and subject matter of the attachment, determining what subroutines are associated with the context and subject matter of the attachment; and
  displaying an interactive list of the subroutines associated with the object type, and the subroutines associated with the process or associated with the context and subject matter of the attachment.

9. The method of claim 1, wherein identifying context and subject matter of the object content includes identifying terms in the object content, and for the identified terms, determining the third set subroutines associated with at least one of a corresponding field and a corresponding record in the database.

10. The method of claim 1, wherein the recognized structure includes a form.

11. The method according to claim 1, wherein the object that was moved to the drop area is an e-mail data object.

12. The method according to claim 1, wherein the object that was moved to the drop area is a calendar data object.

13. The method according to claim 1, wherein the object that was moved to the drop area is an outgoing instant message data object.

14. The method according to claim 1, wherein the object that was moved to the drop area is an incoming instant message data object.

15. A machine-readable storage medium having stored thereon instructions adapted to be executed by a processor to perform a method for integrating objects external to a business information management system into the business information management system via a user interface of an application program, each of the objects including a content and having one of a plurality of object types, the application program operating according to a collaboration mode and a decision support mode, comprising:
displaying the user interface in the collaboration mode, the user interface including a drop area for receiving the objects by the business information management system and an action area having a plurality of graphical controls corresponding to functions under the collaboration mode;
when the object is moved to the drop area, switching the application program to the decision support mode;
determining an object type of the object;
based upon the object type, determining a set of subroutines corresponding to the object type that updates data stored in the business information system;
comparing content structure of the object with known content structures, the known content structures including at least one of a form structure and a table structure, and further comparing a field pattern of the form structure for the content of the object received in the drop area to pre-stored field patterns to determine whether the object has a recognized form structure;
when the comparison generates a match, identifying a set of subroutines associated with data fields in the matching structure;
if the comparison does not generate a match,
  analyzing the content of the object for identifying context and subject matter of the object content, and,
  based on the identified context and subject matter of the object content, determining a set of subroutines associated with the identified context and subject matter; and
displaying an interactive list of the subroutines associated with the object type, the matching structure, and the identified context and subject matter of the object content.

16. The machine-readable storage medium according to claim 15, the method further comprising:
scanning the content of the object received in the drop area for a structure identifier, and comparing the structure identifier to pre-stored identifiers to determine whether the object has a recognized structure.

17. The machine-readable storage medium according to claim 15, the method further comprising:
comparing the content of the object received in the drop area to pre-stored patterns to determine whether the object has a recognized structure.

18. The machine-readable storage medium according to claim 15, the method further comprising:
identifying the sender of the received object;
searching for information associated with the identified sender;
determining what subroutines are associated with the sender and the information associated with the sender;
displaying the subroutines associated with the sender and the information associated with the sender in the interactive list; and
displaying the information associated with the sender.

19. The machine-readable storage medium according to claim 18, the method further comprising:
receiving telephone-caller identification data sent with a telephone call;
searching for information associated with the caller;
determining what subroutines are associated with the caller and the information associated with the caller;
determining what subroutines are associated with telephone calls; displaying an interactive list of subroutines comprising the subroutines associated with the caller and the information associated with the caller, and the subroutines associated with telephone calls; and
displaying the information associated with the caller.

20. The machine-readable storage medium according to claim 15, the method further comprising:

if the object received in the drop area includes an attachment, displaying a query asking whether the object or the attachment should be processed; and processing the attachment as the object, if a response to the query indicates that the attachment should be processed.

21. The machine-readable storage medium according to claim 15, the method further comprising:

receiving an instant message;

determining what subroutines are associated with instant messages;

analyzing the content of the instant message to identify context and subject matter of the instant message, and for the identified context and subject matter of the instant message, determining what subroutines are associated with; and displaying an interactive list of the subroutines associated with the instant message, and the subroutines associated with the identified context and subject matter of the instant message.

22. The machine-readable storage medium according to claim 15, the method further comprising:

receiving an instant message;

if the instant message includes an attachment, displaying a query asking whether the instant message or the attachment should be processed;

if a response to the query indicates that the attachment should be processed, then:

based upon an object type of the attachment, determining what subroutines are associated with the object type;

if the attachment has a recognized structure, identifying a process associated with the recognized structure, and determining what subroutines are associated with the process;

if the attachment does not have a recognized structure, analyzing content of the attachment to identify context and subject matter of the attachment, and for identified context and subject matter of the attachment, determining what subroutines are associated with the context and subject matter of the attachment; and displaying an interactive list of the subroutines associated with the object type, and the subroutines associated with the process or associated with the context and subject matter of the attachment.

23. The machine-readable storage medium according to claim 15, wherein the object that was moved to the drop area is an e-mail data object.

24. The machine-readable storage medium according to claim 15, wherein the object that was moved to the drop area is a calendar data object.

25. The machine-readable storage medium according to claim 15, wherein the object that was moved to the drop area is an outgoing instant message data object.

26. The machine-readable storage medium according to claim 15, wherein the object that was moved to the drop area is an incoming instant message data object.

27. A method for integrating objects into a business information management system via a user interface of an application program, each of the objects including a content and being associated with one of a plurality of object types, the application program having a collaboration mode and a decision support mode, comprising:

displaying the user interface according to the collaboration mode, the user interface including a drop area for receiving the objects by the business information management system and an action area for a plurality of graphical controls corresponding to functions under the collaboration mode;

when the object is moved to the drop area, switching the application program to the decision support mode;

identifying an object type of the object as a business contact, and for the business contact type:

searching the business information management system;

determining whether the business contact already is stored in the business information management system; and if not, updating the business information management system with business contact;

comparing the content structure of the identified object with known content structures, the known content structures including at least one of a form structure and a table structure, and further comparing a field pattern of the form structure for the content of the object received in the drop area to pre-stored field patterns to determine whether the object has a recognized form structure;

when the comparison generates a match, identifying a set of subroutines associated with data fields in the matching structure;

if the comparison does not generate a match, analyzing the content of the object for identifying context and subject matter of the object content, and, based on the identified context and subject matter of the object content, determining a set of subroutines associated with the identified context and subject matter; and displaying an interactive list of the subroutines associated with the object type, the matching structure, and the identified context and subject matter of the object content.

28. The method of claim 27, further comprising:

when the object is moved to the drop area, switching the application program to the decision support mode; and displaying the user interface according to the decision support mode, the user interface including the action area having a plurality of graphical controls corresponding to functions under the decision support mode.

29. The method of claim 1, further comprising:

when the object is moved to the drop area, switching the application program to the decision support mode; and displaying the user interface according to the decision support mode, the user interface including the action area having a plurality of graphical controls corresponding to functions under the decision support mode.

30. The method according to claim 27, wherein the object that was moved to the drop area is an e-mail data object.

31. The method according to claim 27, wherein the object that was moved to the drop area is a calendar data object.

32. The method according to claim 27, wherein the object that was moved to the drop area is an outgoing instant message data object.

33. The method according to claim 27, wherein the object that was moved to the drop area is an incoming instant message data object.

34. A method for integrating objects into a business information management system via a user interface of an application program, each of the objects including a content and being associated with one of a plurality of object types, the application program having a collaboration mode and a decision support mode, comprising:

displaying the user interface according to the collaboration mode, the user interface including a drop area for receiving the objects by the business information management system and an action area for a plurality of graphical controls corresponding to functions under the collaboration mode;

when the object is moved to the drop area, switching the application program to the decision support mode;

identifying an object type as a sender,
- searching information about the sender in the business information management system;
- retrieving the information about the sender from the business information management system;
- displaying the information about the sender;
- determining a set of subroutines relating to the sender;

comparing the content structure of the identified object with known content structures, the known content structures including at least one of a form structure and a table structure, and further comparing a field pattern of the form structure for the content of the object received in the drop area to pre-stored field patterns to determine whether the object has a recognized form structure;

when the comparison generates a match, identifying a set of subroutines associated with data fields in the matching structure;

if the comparison does not generate a match,
- analyzing the content of the object for identifying context and subject matter of the object content, and,
- based on the identified context and subject matter of the object content, determining a set of subroutines associated with the identified context and subject matter; and displaying an interactive list of the subroutines associated with the object type, the matching structure, and the identified context and subject matter of the object content.

35. The method according to claim 34, wherein the object that was moved to the drop area is an e-mail data object.

36. The method according to claim 34, wherein the object that was moved to the drop area is a calendar data object.

37. The method according to claim 34, wherein the object that was moved to the drop area is an outgoing instant message data object.

38. The method according to claim 34, wherein the object that was moved to the drop area is an incoming instant message data object.

* * * * *